United States Patent [19]

Tanaka

[11] Patent Number: 4,853,778
[45] Date of Patent: Aug. 1, 1989

[54] METHOD OF COMPRESSING IMAGE SIGNALS USING VECTOR QUANTIZATION

[75] Inventor: Nobuyuki Tanaka, Kanagawa, Japan

[73] Assignee: Fuji Photo Film Co., Ltd., Japan

[21] Appl. No.: 160,377

[22] Filed: Feb. 25, 1988

[30] Foreign Application Priority Data

Feb. 25, 1987 [JP] Japan ................................. 62-42112
Feb. 24, 1988 [JP] Japan ................................. 62-41714

[51] Int. Cl.⁴ ............................................. H04N 7/12
[52] U.S. Cl. ..................................... 358/133; 358/426
[58] Field of Search ............... 358/133, 135, 136, 260, 358/262

[56] References Cited

U.S. PATENT DOCUMENTS

| | | | |
|---|---|---|---|
| 4,541,012 | 9/1985 | Tescher | 358/133 |
| 4,558,350 | 12/1985 | Murakami | 358/133 X |
| 4,670,851 | 6/1987 | Murakami et al. | 358/136 X |
| 4,710,812 | 12/1987 | Murakami et al. | 358/136 |

*Primary Examiner*—Howard W. Britton
*Assistant Examiner*—Victor R. Kostak
*Attorney, Agent, or Firm*—Sughrue, Mion, Zinn, Macpeak & Seas

[57] ABSTRACT

A method of compressing image signals comprises the steps of dividing original image signals representing a two-dimensional image into blocks each of which is composed of a plurality of samples, converting the original image signals at respective picture elements in each of the blocks into n-valued system where n denotes an integer of 2 or larger, calculating means values $m_1$, $m_2$, ..., $m_n$ of the original image signals at the respective picture elements in the block that have the common n-valued signals, and encoding the mean values $m_1$, $m_2$, ..., $m_n$ and the n-valued signals. The mean values $m_1$, $m_2$, ..., $m_n$ and/or the n-valued signals in each of the blocks are then subjected to vector quantization.

3 Claims, 1 Drawing Sheet

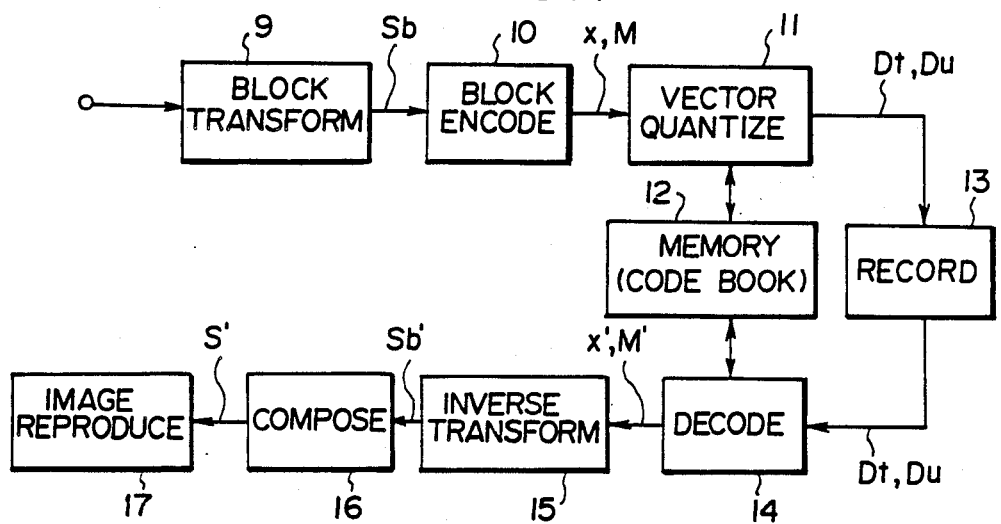
FIG.1
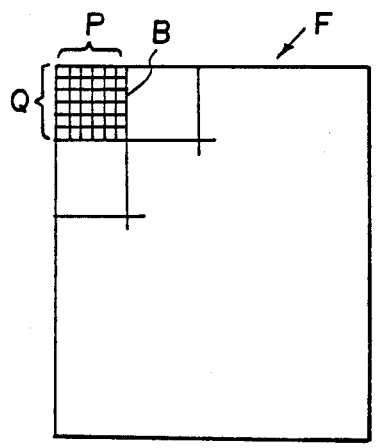
FIG.2
FIG.3

METHOD OF COMPRESSING IMAGE SIGNALS USING VECTOR QUANTIZATION

BACKGROUND OF THE INVENTION

1. Field of the Invention

This invention relates to a method of compressing image signals. This invention particularly relates to a method of compressing image signals so that a high signal compressibility is obtained by utilizing block encoding and vector quantization.

2. Description of the Prior Art

Image signals representing half tone images, such as television signals, are composed of enormous amounts of information, and a broad-band transmission line is required for transmission of the image signals. Such image signals involve much redundancy, and various attempts have been made to compress the image signals by restricting the redundancy. Also, in recent years, recording of half tone images on optical disks, magnetic disks, or the like has been generally put into practice. In this case, image signal compression is conducted generally for the purpose of efficiently recording image signals on a recording medium.

One of the methods of image signal compression that has heretofore been known is a method wherein block encoding is utilized. The method of compressing image signals by block encoding comprises the steps of (i) dividing the original image signals representing a two-dimensional image into blocks each of which is composed of a plurality of samples, (ii) converting the original image signals at the respective picture elements in each of the blocks into n-valued system where n denotes an integer of 2 or larger, (iii) calculating means values $m_1, m_2, \ldots, m_n$ of the original image signals at the respective picture elements in the block that have the common n-valued signals, and (iv) encoding the mean values $m_1, m_2, \ldots, m_n$ and the n-valued signals.

With the aforesaid method of compressing image signals by block encoding, in the case where the density scale of a single picture element is of, for example, 256 levels (=8 bits), division into blocks is carried out in the unit of $4 \times 4 = 16$ picture elements and the original image signals are converted into the two-valued system, the amount of the image signals per block becomes equal to $16 \times 1$ bits plus the amount of signals representing the mean values $m_1$ and $m_2$ (both may be of approximately 8 bits). Thus the image signals can be compressed substantially as compared with the original signal amount ($=16 \times 8$ bits).

Ordinarily, the image signals in the block have high correlation therebetween. Therefore, in the case where the aforesaid mean value is employed for the picture elements whose n-valued signals are equal to one another, the mean value corresponds to the original image signals with a slight distortion. Accordingly, in the course of image reconstruction, the aforesaid mean values are employed for the respective picture elements on the basis of the n-valued signals at the respective picture elements, and the image is reproduced on the basis of the signals. In this manner, a reconstructed image which is not so different from the original image can be obtained.

The aforesaid method of compressing image signals utilizing block encoding gives rise to little deterioration in the image quality in the case where the image composed of many low-frequency components, and therefore is suitable particularly for a radiation image composed of many low-frequency components. However, a need exists for further improvement of the signal compressibility.

SUMMARY OF THE INVENTION

The primary object of the present invention is to provide a method of compressing image signals, which improves the signal compressibility over the conventional method by utilizing the block encoding.

Another object of the present invention is to provide a method of compressing image signals, which enables an increase in the number of images recordable on a recording medium or an increase in the signal transmission efficiency.

The present invention provides a method of compressing image signals by:

(i) dividing original image signals representing a two-dimensional image into blocks each of which is composed of a plurality of samples, (ii) converting the original image signals at respective picture elements in each of the blocks into n-valued system where n denotes an integer of 2 or larger, (iii) calculating mean values $m_1, m_2, \ldots, m_n$ of the original image signals at the respective picture elements in the block that have the common n-valued signals, and (iv) encoding the mean values $m_1, m_2, \ldots, m_n$ and the n-valued signals, wherein the improvement comprises the steps of:

(a) carrying out vector quantization of said mean values $m_1, m_2, \ldots, m_n$ and/or said n-valued signals in each of said blocks.

With the method of compressing image signals in accordance with the present invention, signal compression is achieved to an extent higher than with the conventional method of compressing image signals utilizing block encoding. Therefore, particularly in the case where images such as high-gradation medical images are to be recorded, the number of the images recordable on a recording medium can be increased markedly. Also, in the case where the method of compressing image signals in accordance with the present invention is applied to image signal transmission, the signal transmission path can be reduced markedly, or the transmission time can be shortened markedly.

In general, vector quantization is applied to the original image signals carrying a two-dimensional image. In this case, two-dimensional image signals are divided into blocks each comprising $P \times Q$ number of samples, and a vector that corresponds with the minimum distortion to the set of the image signals in each of the blocks is selected from a code book comprising a plurality of vectors different from one another and prepared in advance by defining $P \times Q$ number of vector elements. Then, the information representing the selected vector in the code book is encoded to correspond to the block.

Since the image signals in the block as mentioned above have high correlation therebetween, the image signals in each block can be represented very accurately by one of a comparatively small number of vectors prepared in advance. Therefore, transmission or recording of the image signals can be carried out by transmitting or recording a code representing the vector, instead of the image signals themselves, and signal compression can thus be achieved. By way of example, the amount of the image signals at 64 picture elements in a half tone image of a density scale composed of 256 levels (=8 bits) is $8 \times 64 = 512$ bits. In the case where the 64 picture elements are grouped as a single block, the respective image signals in the block are expressed by a vector composed of 64 vector elements, and a code book including 256 such vectors is prepared, the amount of the signals per block becomes equal to the amount of the signals for discrimination between the vectors, i.e. 8 bits. Consequently, in this case, the amount of the signals can be compressed to 1/64.

In the method of compressing image signals in accordance with the present invention, instead of applying the aforesaid vector quantization to the original image signals, the vector quantization is applied to the mean values $m_1$, $m_2$, ..., $m_n$ and/or the n-valued signals obtained by block encoding. Such mean values and n-valued signals have correlation among the mean values and among the n-valued signals, i.e. they have redundancy, though they have been obtained via block encoding. Therefore, signal compression is achieved by carrying out vector quantization of these signals.

As mentioned above, with the method of compressing image signals in accordance with the present invention wherein block encoding and vector quantization are utilized in combination with each other, the signal compressibility can be increased to an extent higher than the case where block encoding alone is carried out.

BRIEF DESCRIPTION OF THE DRAWINGS

FIG. 1 is a block diagram showing the configuration of an apparatus for carrying out the method of compressing image signals in accordance with the present invention, FIG. 2 is an explanatory view showing the division of image signals into blocks, and FIG. 3 is a schematic view showing an example of two-valued signals obtained by block encoding.

DESCRIPTION OF THE PREFERRED EMBODIMENTS

The present invention will hereinbelow be described in further detail with reference to the accompanying drawings.

With reference to FIG. 1, original image signals S representing a single continuous tone image are fed to a block transformation circuit 9 in which they are transformed into original image signals Sb of each of rectangular blocks which comprises P×Q picture elements. The division into the blocks is shown in FIG. 2. With reference to FIG. 2, F denotes the original image, and B denotes a single block. For simplicity of explanation, the density scale of each picture element is assumed to be of 256 levels (=8 bits) and the block B is assumed to comprise 6×6 picture elements in the description below.

The original image signals Sb of the block B are then fed to a block encoding circuit 10 and subjected to block encoding. Specifically, the block encoding circuit 10 calculates a mean value So of the 36 original image signals Sb in a single block which are fed to the block encoding circuit 10, and carries out conversion into the two-valued system by converting the original image signals Sb having values larger than the mean value So into "1", and converting the original image signals Sb having values which are not larger than the mean value So into "0". The two-valued signals obtained in this manner become as shown in, for example, FIG. 3. Thereafter, the block encoding circuit 10 calculates a mean value $m_1$ of the original image signals Sb at the picture elements to which the value "0" has been assigned, and a mean value $m_2$ of the original image signals Sb at the picture elements to which the value "1" has been assigned. The block encoding circuit 10 outputs signals M representing the mean values $m_1$ and $m_2$ calculated in this manner, and two-valued signals x at the aforesaid 36 picture elements. As mentioned above, the two-valued signals x and the mean values $m_1$ and $m_2$ are capable of representing the original image with a slight distortion. Also, in the case where the mean values $m_1$ and $m_2$ are each expressed by 8 bits whereas the signal amount of the original image signals Sb at the 36 picture elements is 36×8 bits, the two-valued signals x and the mean values $m_1$ and $m_2$ can be expressed by a signal amount equal to 36×1 bits plus 2×8 bits. Namely, by carrying out the aforesaid block encoding, the signal amount can be compressed to $$\frac{36 \times 1 \text{ bits} + 2 \times 8 \text{ bits}}{36 \times 8 \text{ bits}}$$

$$\approx 1/5.5$$

The two-valued signals x and the mean values $m_1$ and $m_2$ are then fed to a vector quantizer 11. The vector quantizer 11 selects a vector, that corresponds with the minimum distortion to the set of the fed two-valued signals x of the block B (the set comprises 36 signals), from a plurality of vectors stored as a code book in a memory 12. Specifically, the memory 12 stores a code book representing, by way of example, 16 vectors, $\vec{x}(1)$, $\vec{x}(2)$, $\vec{x}(3)$, ..., $\vec{x}(16)$ respectively defining 36 vector elements $\hat{x}_1^{(n)}$, $\hat{x}_2^{(n)}$, ..., $\hat{x}_{36}^{(n)}$ where n=1, 2, ..., 16 as shown below.

$$\vec{x}(1) = (\hat{x}_1^{(1)}, \hat{x}_2^{(1)}, \hat{x}_3^{(1)} \ldots \hat{x}_{36}^{(1)})$$

$$\vec{x}(2) = (\hat{x}_1^{(2)}, \hat{x}_2^{(2)}, \ldots \hat{x}_{36}^{(2)})$$

$$\vec{x}(3) = (\hat{x}_1^{(3)}, \hat{x}_2^{(3)}, \ldots \hat{x}_{36}^{(3)})$$

.
.
.

$$\vec{x}(16) = (x_1^{(16)}, x_2^{(16)} \ldots x_{36}^{(16)})$$

The vector quantizer 11 finds a vector $\vec{x}(t)$ whose vector elements ($\hat{x}_1$, $\hat{x}_2$, $\hat{x}_3$, ..., $\hat{x}_{36}$) correspond with the minimum distortion to the set ($x_1$, $x_2$, $x_3$, ..., $x_{36}$) of the two-valued signals x, and outputs an encoded signal Dt which represents a vector identification number "t" defining the vector $\vec{x}(t)$. As the distortion, by way of example, the mean square error expressed as $$d = \frac{1}{k} \sqrt{\sum_{i=1}^{k} |Xi - \hat{X}i|^2}$$

is utilized (k=36 in this example). In order to find such a vector $\vec{x}(t)$ that the distortion is the minimum, the distortion may be calculated for all of the vectors, and the vector $\vec{x}(t)$ exhibiting the minimum distortion may be found (this method is referred to a total search type vector quantization). Alternatively, in order to shorten the processing time, binary tree search type vector quantization may be carried out though the distortion may not completely become the minimum.

An appropriate code book comprising the vectors respectively defining the vector elements ($\hat{x}_1$, $\hat{x}_2$, $\hat{x}_3$, ..

..., $\hat{x}_{36}$) may be prepared by preparing a training image of the same type as the image on which signal compression is to be carried out, and using a known method on the basis of the training image.

The vector quantizer 11 also carries out vector quantization of the mean values $m_1$ and $m_2$ represented by the signals M in the same manner as mentioned above. For this purpose, the memory 12 stores, besides the aforesaid code book, a code book representing, by way of example, 64 vectors $\vec{m}(1)$, $\vec{m}(2)$, $\vec{m}(3)$, ..., $m(64)$ respectively defining two vector elements ($\hat{m}_1^{(n)}$, $\hat{m}_2^{(n)}$) where $n = 1, 2, \ldots, 64$ as shown below.

$$\vec{m}(1) = (\hat{m}_1^{(1)}, \hat{m}_2^{(1)})$$

$$\vec{m}(2) = (\hat{m}_1^{(2)}, \hat{m}_2^{(2)})$$

$$\vec{m}(3) = (\hat{m}_1^{(3)}, \hat{m}_2^{(3)})$$

$$\vdots$$

$$\vec{m}(64) = (m_1^{(64)}, m_2^{(64)})$$

The vector quantizer 11 finds a vector $\vec{m}(u)$ whose vector elements ($\hat{m}_1$, $\hat{m}_2$) correspond with the minimum distortion to the set ($m_1$, $m_2$) of the mean values, and outputs an encoded signal Du which represents a vector identification number "u" defining the vector $\vec{m}(u)$. As the distortion, by way of example, the aforesaid mean square error may be employed. Also, searching of the vector $\vec{m}(u)$ and setting of the appropriate code book are carried out in the same manner as mentioned above.

The signal compression effects by carrying out vector quantization in the manner as mentioned above will now be described in detail. In this embodiment, the discrimination signal Dt for the vector representing the two-valued signals x may be such that the 16 vectors can be discriminated from one another, and can therefore be expressed by 4 bits. On the other hand, the discrimination signal Dm for the vector representing the mean values $m_1$ and $m_2$ may be such that the 64 vectors can be discriminated from one another, and can therefore be expressed by 6 bits. On the other hand, as mentioned above, signals of $2 \times 8$ bits are necessary for directly representing the mean values $m_1$ and $m_2$, and signals of $36 \times 1$ bits are necessary for directly representing the two-valued signals x. Therefore, the signal compressibility by vector quantization becomes $$\frac{4 \text{ bits} + 6 \text{ bits}}{2 \times 8 \text{ bits} + 36 \times 1 \text{ bits}}$$

$$\approx 1/5.2$$

Also, the total signal compressibility (obtained by block encoding and vector quantization) becomes $(1/5.5)/5.2 = 1/28.6$.

The vector selection and the output of the vector discrimination signals Dt and Du as mentioned above are carried out for all of the blocks B in a single image which the original image signals S represent. In this embodiment, the vector discrimination signals Dt and Du thus generated are recorded on a recording medium (image file) such as an optical disk or a magnetic disk in a recording and reproducing apparatus 13. In the case where the division of the overall original image signals S into the blocks is carried out in a predetermined sequence, the vector discrimination signals Dt and Du fed sequentially to the recording and reproducing apparatus 13 can be recorded so as to correspond to the respective blocks B. In order to have the vector discrimination signals Dt and Du correspond to the respective blocks B, block discrimination signals may be added to the vector discrimination signals Dt and Du in the course of the recording. As mentioned above, each of the vector discrimination signals Dt and Du can be expressed by a signal amount markedly smaller than the amount of the original image signals x, a large number of the images can be recorded on the recording medium such as the optical disk.

In the course of image reproduction, each of the vector discrimination signals Dt and Du indirectly representing the image signals is read from the recording medium, and is transformed by a decoder 14 into reconstructed signals x' and M'. Specifically, the decoder 14 reads the vector, which the vector discrimination signal Dt fed thereto represents, from the code book stored in the memory 12, and outputs the vector elements ($\hat{x}_1$, $\hat{x}_2$, $\hat{x}_3$, ..., $\hat{x}_{36}$), which are defined for said vector, as the reconstructed two-valued signals x' for a single block B. Also, the decoder 14 reads the vector, which the vector discrimination signal Du fed thereto represents, from the memory 12, and outputs the vector elements ($\hat{m}_1$, $\hat{m}_2$), which are defined for said vector, as the reconstructed mean value signals M' for a single block B.

In an inverse transformation circuit 15, the reconstructed signals x' and M' are subjected to reconstruction of the image signals of each block. Specifically, the inverse transformation circuit 15 forms reconstructed image signals Sb' of a single block by assigning the mean value $m_1$ to the picture elements at which the reconstructed signals x' represent the value "0", and assigning the mean value $m_2$ to the picture elements at which the reconstructed signals x' represent the value "1". As mentioned above, the reconstructed image signals Sb' generated in this manner correspond with a slight distortion to the original image signals Sb. The reconstructed image signals Sb' are then sent to a composing circuit 16. In the composing circuit 16, the reconstructed image signals Sb' are transformed from the signals per block to the signals for a single image. The image signals S' obtained by said transformation in the composing circuit 16 have slight distortion with respect to the original image signals S, and are approximately equal to the original image signals S. The image signals S' are ultimately sent to an image reproducing apparatus 17. In the image reproducing apparatus 17, an image approximately identical with the original image that the original image signals S represent is reproduced on the basis of the image signals S'.

In the aforesaid embodiment, the original image signals of each block B are converted to the two-valued system. However, the original image signals may also be converted to the system classified into three or more values.

Also, in the aforesaid embodiment, both the mean values $m_1$, $m_2$ obtained by block encoding and the two-valued signals x are subjected to vector quantization. However, only either one of the n-valued signals and the "n" number of mean values may be subjected to vector quantization. However, in order to increase the signals compressibility, both the n-valued signals and the "n" number of mean values should preferably be subjected to vector quantization.

What is claimed is:

1. A method of compressing image signals by:

(i) dividing original image signals representing a two-dimensional image into blocks, each of said blocks being composed of a plurality of samples, (ii) converting the original image signals at respective picture elements in each of the blocks into an n-valued system where each of the plurality of samples has one of the n-values and, where n denotes an integer of 2 or larger, (iii) calculating mean values $m_1, m_2, \ldots, m_n$ of the original image signals at the respective picture element in the block that have the common n-valued signals, and (iv) encoding the mean values $m_1, m_2, \ldots, m_n$ and the n-valued signals, wherein the improvement comprises the steps of:

(a) carrying out vector quantization of said mean values $m_1, m_2, \ldots m_n$ and/or said n-valued signals in each of said blocks.

2. A method as defined in claim 1 wherein said vector quantization comprises the step of selecting a vector that corresponds with the minimum distortion to the set of said mean values $m_1, m_2, \ldots, m_n$ in each of said blocks from a code book comprising a plurality of vectors different from one another and each prepared in advance by defining "n" number of vector elements.

3. A method as defined in claim 1 or 2 wherein said vector quantization comprises the step of selecting a vector that corresponds with the minimum distortion to the set of said n-valued signals in each of said blocks from a code book comprising a plurality of vectors different from one another and each prepared in advance of defining vector elements in a number equal to the number of said samples in each of said blocks.

* * * * *